United States Patent [19]

Forson

[11] Patent Number: 4,481,577
[45] Date of Patent: Nov. 6, 1984

[54] METHOD OF OPERATING A COMPUTER SYSTEM TO PROVIDE CUSTOMIZED RESPONSES

[75] Inventor: Henry M. Forson, New Monmouth, N.J.

[73] Assignee: AT&T Bell Laboratories, Murray Hill, N.J.

[21] Appl. No.: 361,821

[22] Filed: Mar. 25, 1982

[51] Int. Cl.³ ............................ G06F 7/00; G06F 3/00
[52] U.S. Cl. ...................................................... 364/200
[58] Field of Search ... 364/200 MS File, 900 MS File, 364/419; 381/51, 52, 53

[56] References Cited

U.S. PATENT DOCUMENTS

| | | | |
|---|---|---|---|
| 3,906,457 | 9/1975 | Mattedi et al. | 364/200 |
| 4,135,662 | 1/1979 | Dlugos | 364/900 |
| 4,218,760 | 8/1980 | Levy | 364/900 |
| 4,319,337 | 3/1982 | Sander et al. | 364/900 |
| 4,365,315 | 12/1982 | Jamnik | 364/900 |
| 4,443,856 | 4/1984 | Hashimoto | 381/51 X |

OTHER PUBLICATIONS

"An Interactive Tutorial System For Teaching Programming", Edmonds and Guest, Computer Systems and Technology, IERE Conf. Proc., No. 36, pp. 263-270.

Primary Examiner—Raulfe B. Zache
Assistant Examiner—Mark P. Watson
Attorney, Agent, or Firm—Daniel D. Dubosky

[57] ABSTRACT

A method of operating a computer system is disclosed that is useful in connection with programs that provide the user with messages such as error messages. The error messages are stored in an indexed file, at least some of the messages having token words whose meaning must be provided in order to give complete meaning to the error message. A dictionary list of the definitions for all token words that may be encountered when a command of the program is executed is developed prior to a point in the program where a message is retrieved from the indexed file. If the proper condition is developed to indicate that an error message is necessary, the error message number corresponding to that condition is used to recover the appropriate error message with token words either from the indexed file or from a local header table. The token words are then replaced with definitions from the dictionary list and the error message is delivered to the user.

9 Claims, 10 Drawing Figures

METHOD OF OPERATING A COMPUTER SYSTEM TO PROVIDE CUSTOMIZED RESPONSES

BACKGROUND OF THE INVENTION

This invention relates to a method of operating a programmable computer system and, more particularly, to a method of operating a computer system to provide messages that may be customized for the individual users even though the source code for the program is not available.

Computer programs such as editors and compilers are more meaningful to the user if messages are provided when errors occur. In many programs of the prior art these messages are extremely general in nature and do not convey a full meaning to the user as to what portion of the system failed. In some programs, an error number is provided and the user must then consult a manual in order to obtain a definite meaning to the message. In still other programs, an error message is given, but the message is general in nature and does not relate to the specific action requested. It is more desirable if the command provides the user with a specific indication as to what action failed to be accomplished during the execution of a command.

Specific error messages can be provided by placing the error messages in the body of the program code such that the appropriate error message is called upon the execution failure of a specific command. If the user desires to change a specific message in order to tailor it to his specific environment, he is able to do so quite easily if the source code for the program is available to him. Source code is not available to the user if the program developer desires to keep the property rights to the program as a trade secret. In those situations, there is the problem of providing the user with a system that will permit message changes without also providing the source code of the program.

SUMMARY OF THE INVENTION

In accordance with the present invention, the computer system, when executing a program that may require message response, is caused to develop a dictionary list of definitions for token words that might be encountered in a message. The messages for the program are stored in an indexed file and at least some of the messages have token words within the message. The dictionary list is formed and may be modified any time prior to retrieving a message from the file. If the proper condition is developed during execution of a command, for example, the command fails to execute, a message routine that practices the present invention is called, along with an appropriate number to identify the message that is required for that particular condition. The message number is used to retrieve the appropriate error message with token words and these token words are replaced with definitions from the dictionary list. The message is then delivered to the user.

Since the present invention does not require any particular token words or any particular sequence of token words, there is unlimited flexibility in the form of the message that may be placed in the file by the user. In particular, the user may replace the messages in the file with messages in a different language and need not be concerned with any change in the sequence of token words that may be required in the other language. Since the message file is separate from the program code, changes may be made in the messages without having any knowledge of the source code.

It is a further feature of the present invention that the program also include a local message table that may be used when the message being sought is not present in the message file, or when the message file is inaccessible as during the failure of a storage medium or memory holding the file.

It is still another feature of the present invention that some token words are defined and stored in the dictionary list during an initialization step and remain unchanged during the running of the program.

DETAILED DESCRIPTION

Figure 1:
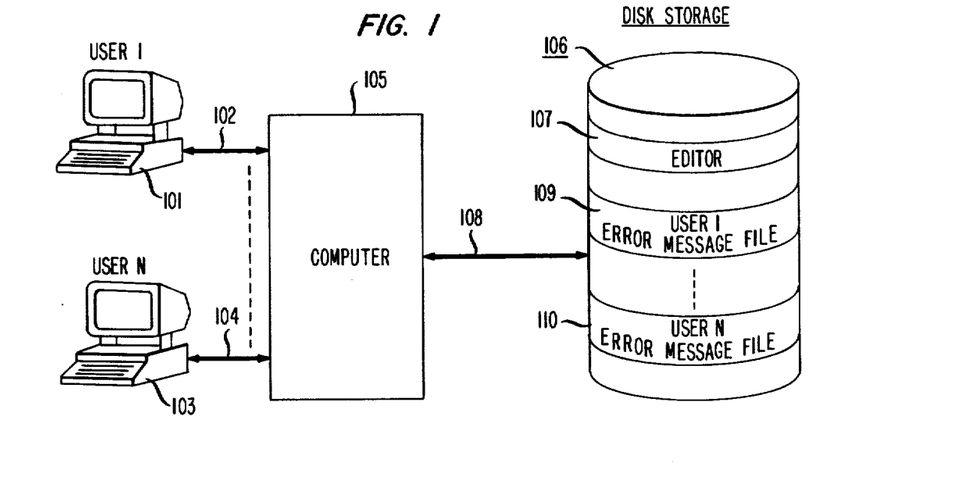
FIG. 1 is a schematic block diagram of a computer system that may be used to practice the present invention.

The present invention is useful in a computer system of the type shown in FIG. 1. In FIG. 1 a user terminal 101 is connected by way of a transmission link 202 to a computer system 105. Other users such as user terminal 103 may also be connected by way of their transmission link to computer system 105. These several users may use the computer system 105 to run identical programs. For example, each of the users may use an editor program 107 to generate their individual files, correspondence and applications programs. This editor program can be stored on a disk medium 106 as in FIG. 1 and the editor program 107 may be coupled for execution by way of a transmission link 108 into the memory of computer system 105. In the alternative, the editor program can also be stored in an internal memory of computer 105 without affecting the usefulness of the present invention. The editor program 107 is frequently written in a source code that is not available to any of the users and, therefore, they are unable to change any error messages that are present within the context of the editor program 107.

In accordance with the present invention, each of the users may have their individual error message files, illustrated in FIG. 1 by files 109 and 110, stored on disk storage medium 106. These files are used in a manner to be described hereinbelow to provide customized error message responses from the editor program during the execution of the editor program. Although the invention is described herein as being used in a multi-user environment, it is to be understood that it is as equally useful in a single user system where the source code is unavailable to the user.

Figure 2:
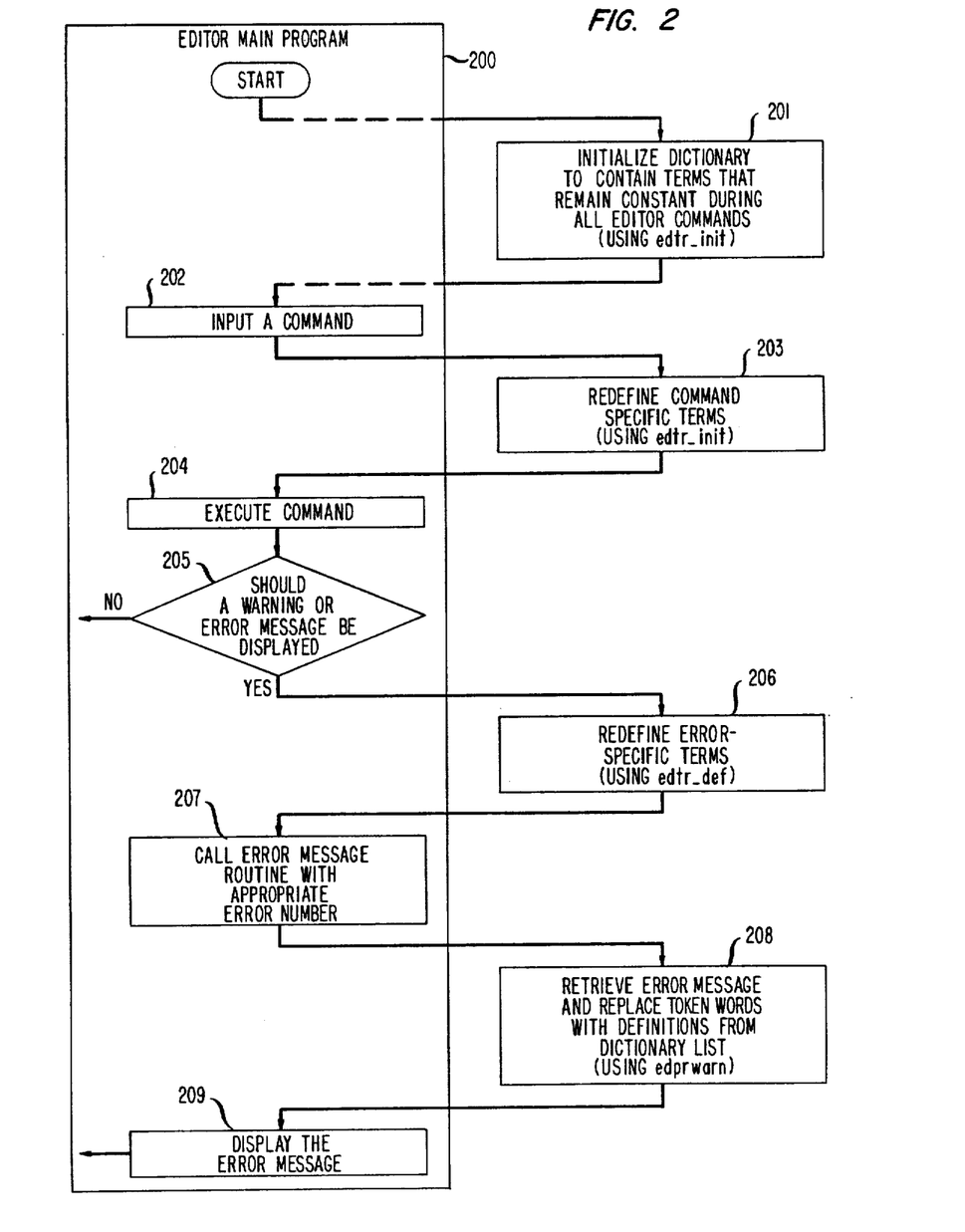
FIG. 2 is a detailed flowchart which delineates the sequence of operations performed by a program in practicing the present invention.
Figure 3:
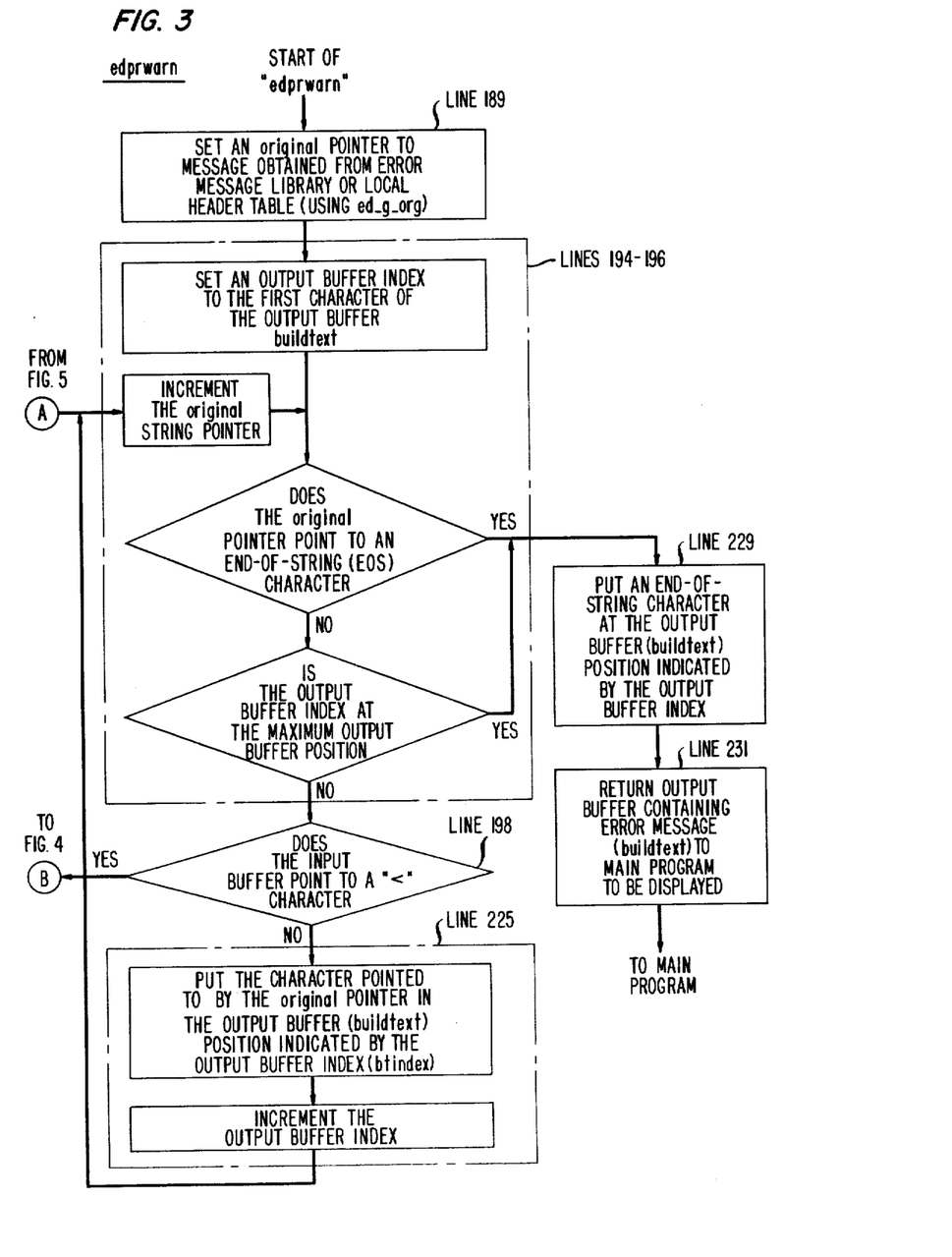
FIGS. 3, 4 and 5 provide a detailed flowchart which delineates the sequence of operations shown as a single step in FIG. 2 of the drawing.
Figure 4:
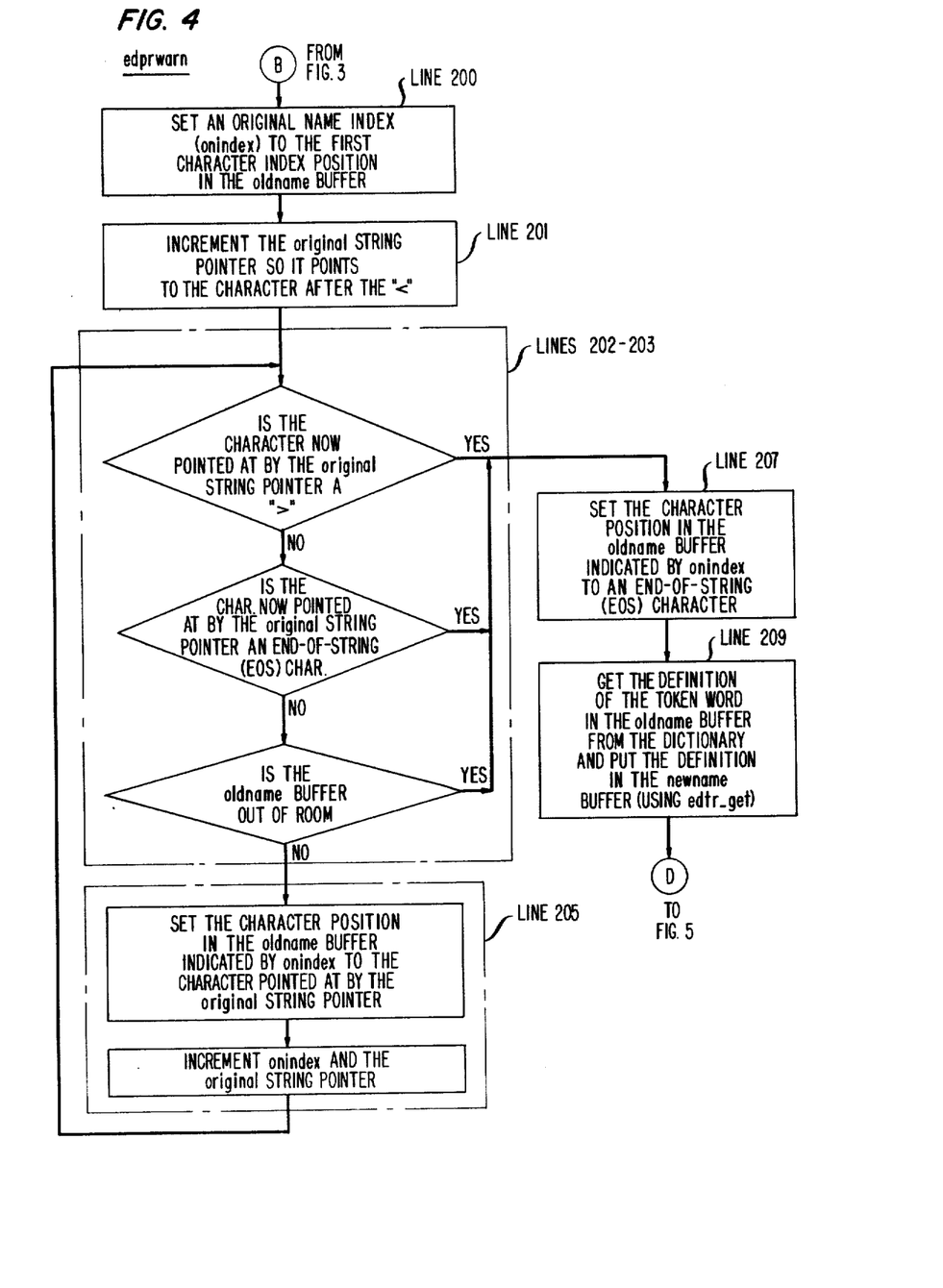
Figure 5:
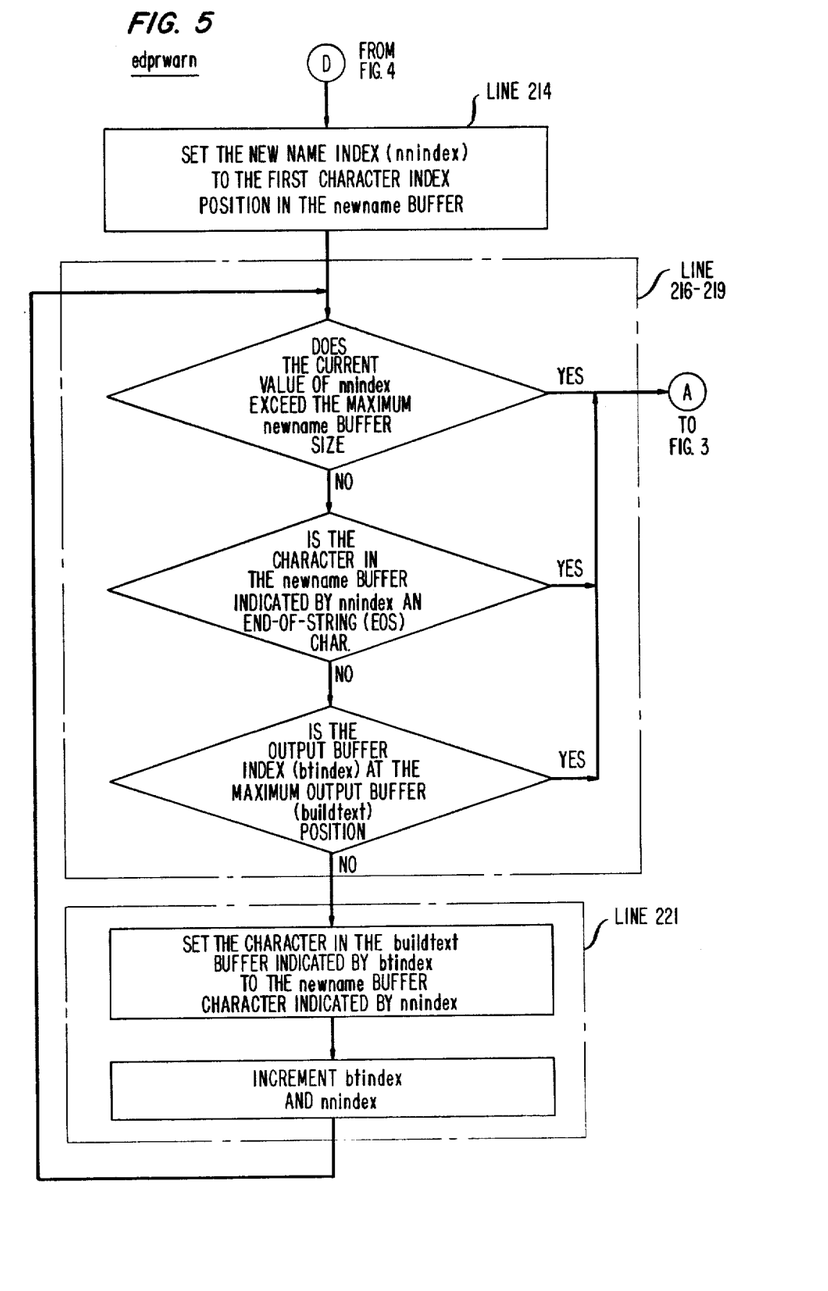
Figure 6:
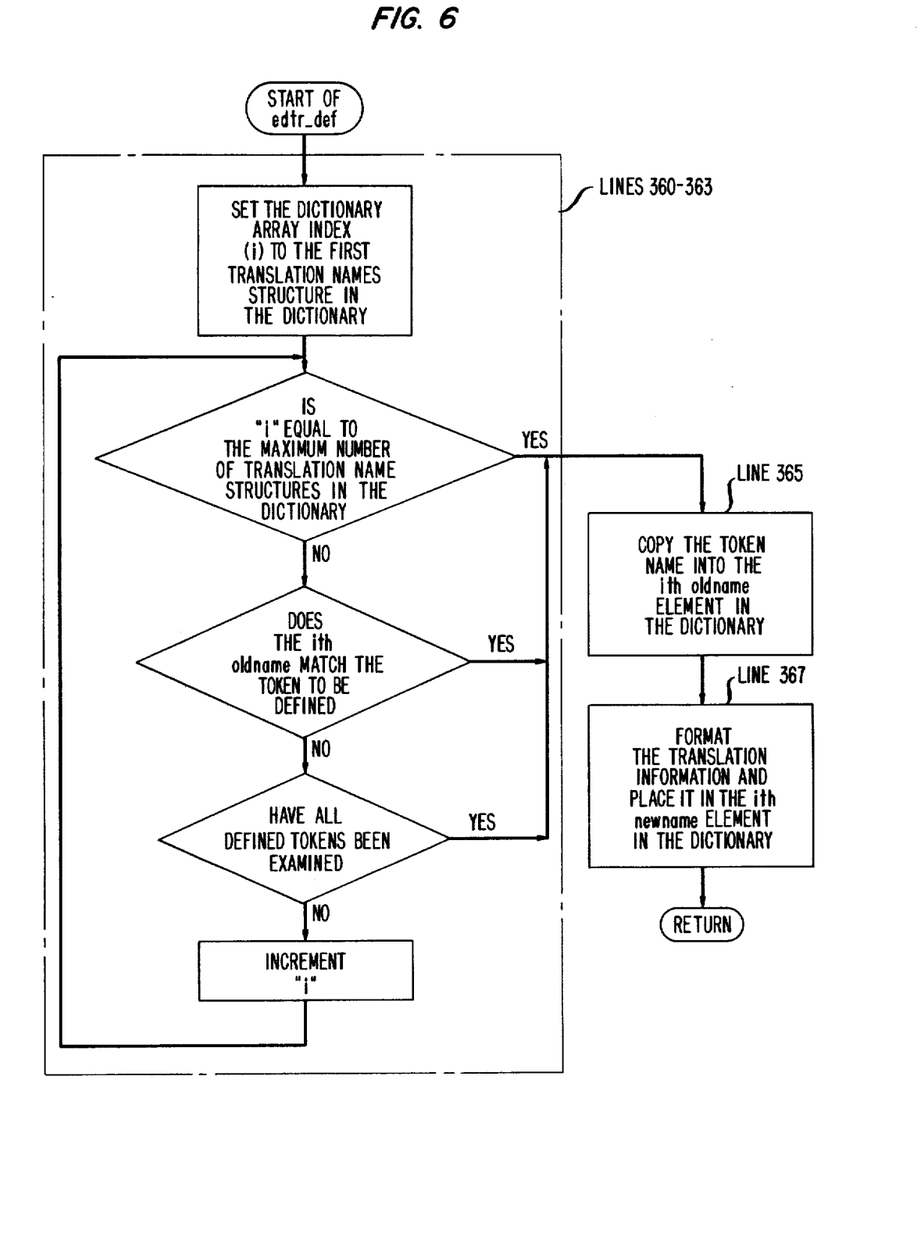
FIGS. 6, 7, 8 and 9 are flowcharts of functions that are used in the flowchart provided by FIGS. 3, 4 and 5.
Figure 7:
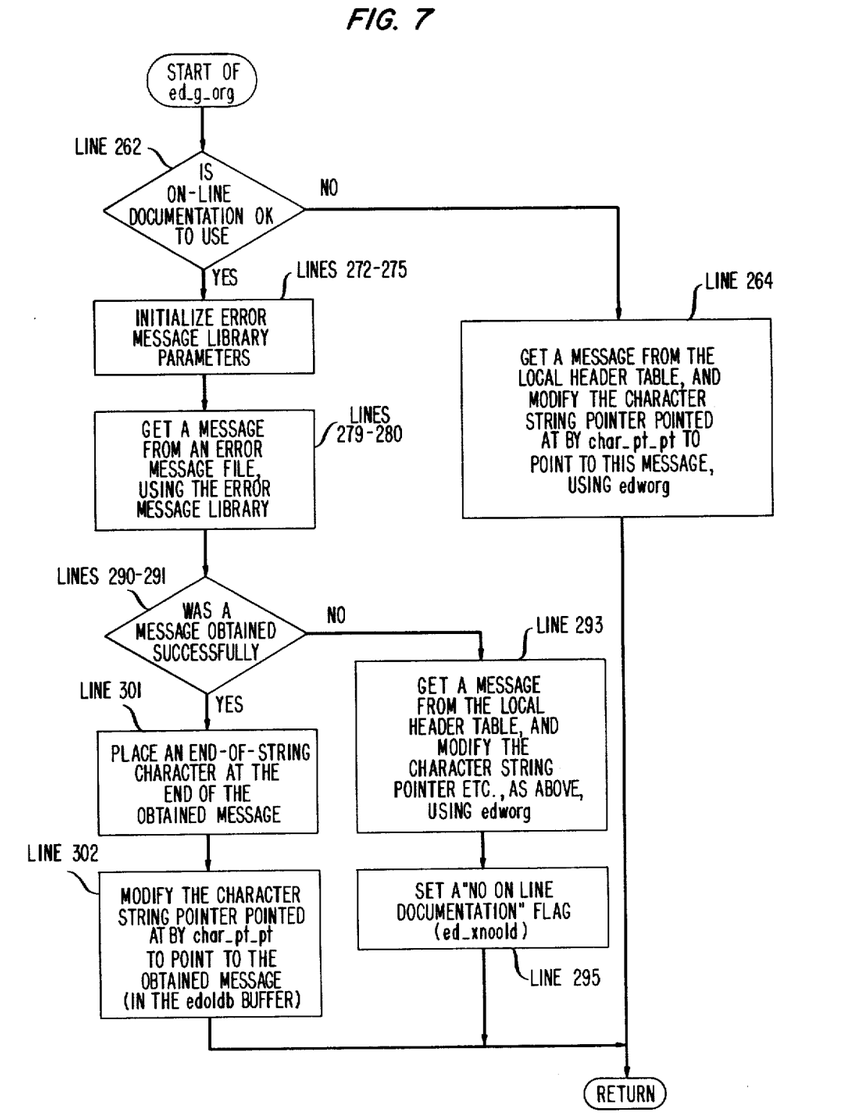
Figure 8:
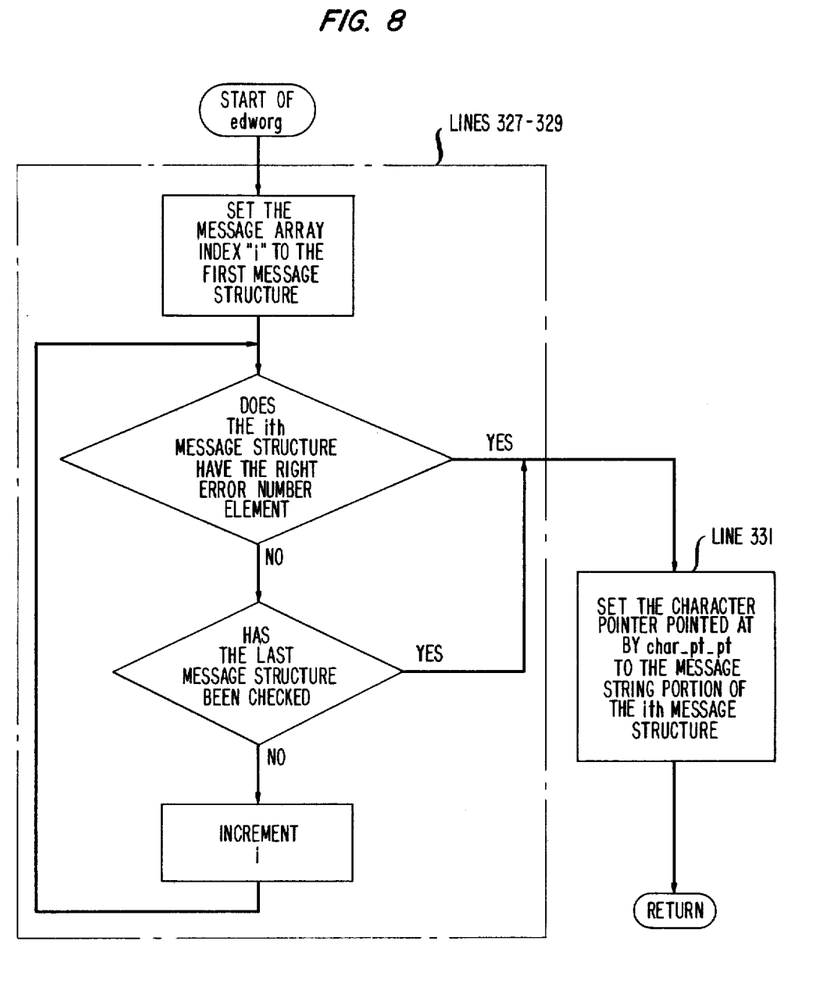
Figure 9:
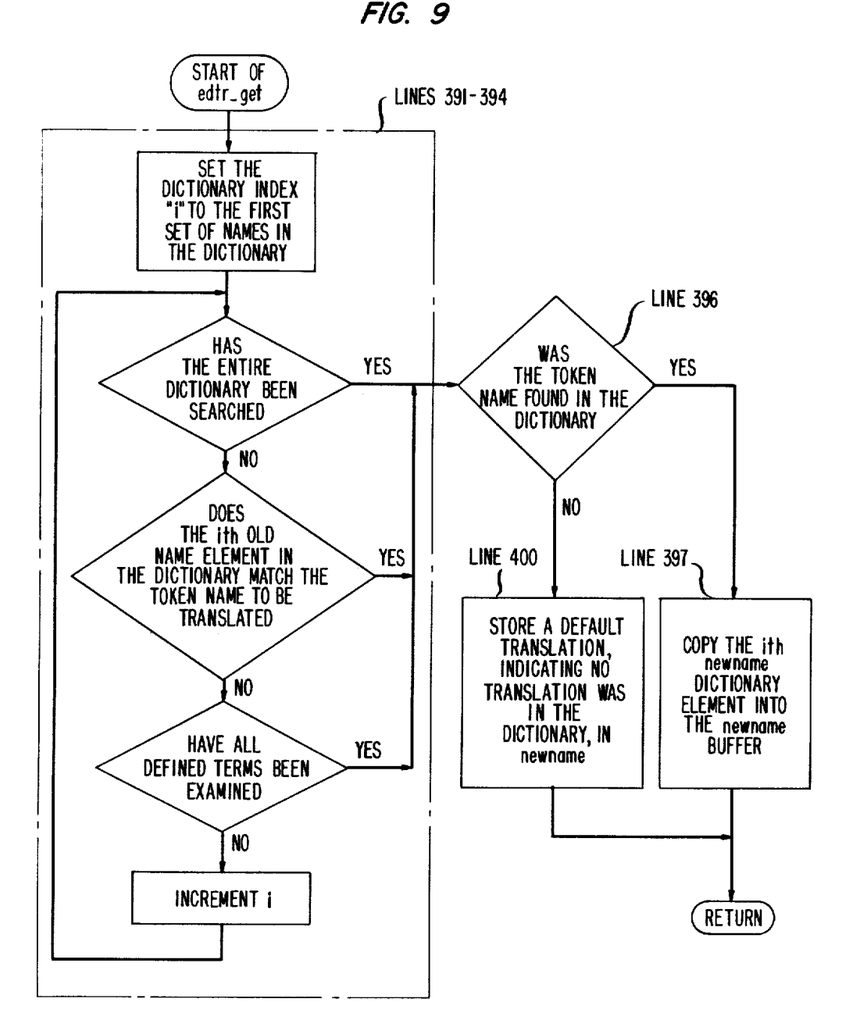

FIG. 2 provides a flowchart which delineates the operations to be performed during the execution of a program that uses the present invention. The box designated as 200 in FIG. 2 represents an editor program of the type that prints an error message when the execution of a command is unsuccessful. This part 200 of the over all program is referred to in FIG. 2 as the editor program and it includes all of the steps in a prior art editor program that are required to perform as an editor. In the interest of simplicity, only the steps that are required to tie in the new functions required to practice the present invention are shown.

As indicated by step 201 in FIG. 2 the dictionary list is initialized to contain terms that remain constant during all editor commands. This initialization of the dictionary may, in fact, occur during the initialization steps that occur in the editor program. The token words that are defined during this initialization process are generally of the type that relate to the editor program as a whole. For example, the release and serial numbers of the editor program, a version number and the date of operation. After this initialization step 201, control is returned to the main editor program and eventually the user will input a command as indicated in step 202. At this point in the process, token words in the dictionary list may be redefined and new token words may be defined and inserted in the dictionary list in accordance with the type of command that has been requested by the user. Control again is returned to the main editor program and the process attempts to execute the command in accordance with step 204. At this point in the process, additional token words may be defined or token words already defined may be redefined as appropriate although this step is not included in the embodiment shown in FIG. 2. As indicated in step 205, the process will come to a point where a determination is made as to whether a warning or error message should be displayed to the user. If no message is to be displayed control remains in the main editor program and no further action is required on the part of the newly introduced routines. If on the other hand a message is required, a subroutine is called to redefine token words that may be specific to the particular error message to be displayed. Here, again, this definition of token words may or may not appear in a process that utilizes the present invention. It is only important in the practice of this invention that token words be defined some time prior to a point in the process where a message with token words is retrieved from the message file. In accordance with step 205, the error message routine is then called by the main process with an appropriate error number to identify the error message that is required. This results in the retrieval of an error message in accordance with step 208, which error message may have token words that are replaced with their definitions from the dictionary list. Finally, the error message with the definitions in place of the token words is returned to the editor main program 200 and this message is displayed or in other ways coupled to the attention of the user.

The operation of this sequence of steps can best be illustrated by taking a specific command that could be given in an editor program and illustrate how the error message for this command is generated. If the user is attempting to "save" a record called "Johnson", for example, in a file called "family", for example, his attempt to do this in the editor system should produce an error message of the following type in case the command is unable to execute: "unable to save record Johnson in file family". In order to make this error message universal in that it is applicable to many commands and to many types of records and files, the error message that is actually stored in the error message file on disk storage medium 106 is as follows: "unable to <cmdname> record <recname> in file <filename>". In this error message, the term "cmdname" corresponds to the command name, the term "recname" corresponds to the record name, and the term "filename" corresponds to the name of the file. These terms between angle brackets ("<" and ">") are in essence token words in that they only represent the actual command name, record name and file name and must be defined during any particular execution of a command in order to give complete meaning to the resulting error message.

In accordance with the present invention, the definitions for these token words and others that may be used in an error message resulting from this command are stored in a dictionary list any time prior to a point in the process where an error message is retrieved from the message file. In the case of the example given hereinabove, the word "save" would be stored as the definition of the token word "cmdname", the word "Johnson" would be stored as the definition for the token word "recname," and the word "family" would be stored as the definition for the token word "filename." If the "save" command is not successful and this error message with token words is retrieved from the error message file, the token words are replaced with their corresponding definitions from the dictionary list, and the resulting error message is displayed to the user.

As a result of the present invention, the error message stored on disk storage medium 106 in the user's error message file may be completely changed by the user, and an unambiguous error message will still result. For example, the user may prefer the error message resulting from the above-discussed "save" command to read as follows: "File family did not receive the record Johnson in response to your save command." To do so the user could store the following error message in his error message file in place of the message described hereinabove: "File <filename> did not receive the record <recname> in response to your <cmdname> command." This unlimited flexibility in the form that an error message can take is particularly important in those cases where the user desires to change the messages into a language for which the parts of speech have different structural relationships than the language on which the messages were written.

DETAILED DESCRIPTION OF SPECIFIC EMBODIMENT

A specific C language implementation of steps 201 and 208 in the present invention is presented as an appendix to this specification. A description of the C language can be found in the text entitled "The C Programming Language" by B. W. Kernighan and D. M. Ritchie, Prentice-Hall Inc., 1978. The lines of the code presented in the appendix will be referred to hereinafter by line number in order to discuss parts of this code and how they relate to the desired functions described hereinabove. The C language file "edmsg.c" presented in the appendix contains routines to obtain messages from the error message library, to translate token words, and to define token words. A structure containing default messages is also defined so that the on-line documentation routine may be by-passed if necessary.

Detailed flowcharts of the main routine of the program, edprwarn, and of several of subroutine functions are presented in FIGS. 3 through 9 of the drawing. Sufficient descriptive material is presented in these flowcharts to enable those who are unfamiliar with C language to appreciate the nature of the steps in the present invention. A one-to-one correspondence is established between the flowcharts and the code in the appendix by labeling the boxes in the flowcharts with the corresponding lines of code in the appendix which implement the steps specified in the flowcharts. Since the source code in the C language is more precise, however, discussion hereinafter will refer to the lines in the source code of the appendix.

Lines 50-53 of the C language program defines a structure that is to be used in a local header table. As indicated in lines 51 and 52 the first structure element in each structure of this array is an integer which identifies the message and the second structure element of each structure in the array is a character string which is the error message for that number. The normally used structures of this array begin on line 59 and continue through line 156. As indicated in line 59 each of these structures has an integer constant that begins with the letters WED followed by a three integer number which in turn is followed by the error message in the next line. These constants are externally defined to be integer error numbers. As can be seen in the character strings shown in lines 59 through 156, many of the error messages have token words that merely represent terms that are related to a specific command. For example, line 84 contains the error message discussed hereinabove to illustrate the operation of the present invention. This line includes the token words cmdname, recname and filename. These error messages in lines 59 through 156 will be present as a local table in the main memory of the computer after the C file is compiled and are used either if there is no on-line documentation or if the error message number cannot be found in the file stored on the appropriate disk storage medium. As pointed out hereinabove, the user can insert his customized error message for any particular error number into an indexed record stored on the disk file, and the corresponding error message of the local header will only be called if the disk storage medium is inoperative. As pointed out hereinabove, the user is completely free to modify the error message in any way desirable.

The local header table is terminated by the EOS term in line 158. This term is coded as a numeric value of 0 by the compiler and is used by the program which follows in order to determine the end of the local header table that contains the error messages.

Figure 10:
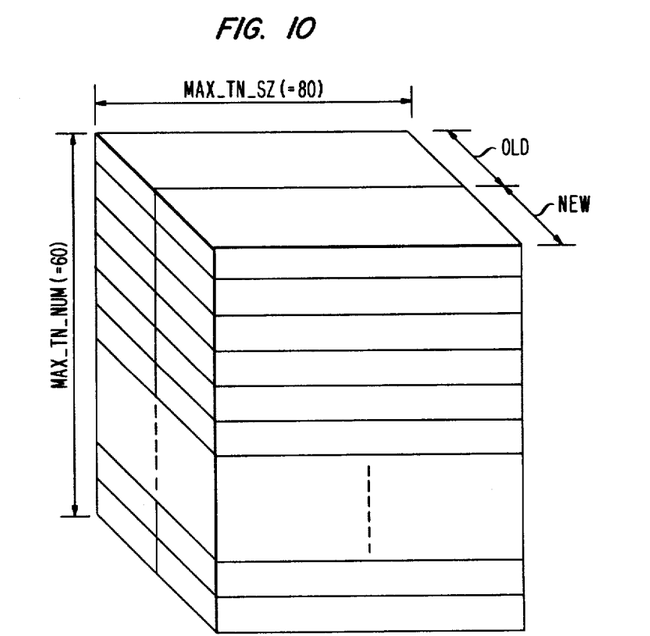
FIG. 10 is a pictorial symbolic representation of an array used to store the dictionary list in accordance with the present invention.

The statement in line 165 causes the compiler to allocate a section of memory for storing the dictionary list of terms. As indicated in line 165, this dictionary list corresponds to a three dimensional array of the type illustrated in FIG. 10. As indicated in FIG. 10, there are 60 elements in the array, each element having two terms, each of which terms are no more than 80 characters long. As will be apparent hereinafter the first term in each element will correspond to a token word which is labeled as the "oldname" in the program, and the second term of each element corresponds to the definition for that token word labeled hereinafter as the "newname."

The main routine of the program, edprwarn, begins on line 173. This routine prints the appropriate message for a given error message number. Lines 176-178 causes the compiler to establish character buffers for a term entitled buildtext which is capable of storing an entire message of 200 characters, for the token word, and for its definition. Line 179 provides storage for a pointer to a character string. Line 187 causes a function to be called which defines a new translation for a given string. In this particular call of the function the string "msgcode" is set up to correspond with the numeric value of the error message code entitled warn_num. This translation is used on line 158 of the local header table to place the proper error message number in the error message shown which indicates that particular number to be unknown for the command being used.

Line 189 causes a function to be called that retrieves the original version of the string either from the error message file on an external disk storage medium 106 or from the local header table described hereinabove.

After the original string is retrieved, the code resulting from lines 194-198 causes the program to search through that string for the first appearance of a "<". If the "<" character is found in the string, the code from lines 202-207 moves the token word into the "oldname" buffer and places an EOS on the end of the token word to terminate it. The function edtr_get is then called in line 209 to find the definition corresponding to the particular token word found. The definition that is found is placed in the "newname" character buffer discussed hereinabove in connection with line 178. Lines 216-221 then places the definition referred to as "newname" in the "buildtext" buffer established by line 176 of the code. Hence the portion of the program from lines 194-227 will loop through the original message string and replace each appearance of a token word with its corresponding definition obtained from the dictionary list. As indicated in lines 224 and 225, if there is no "<" character found, the original message is placed in the buildtext character buffer. Finally the buffer is terminated by an EOS character in line 229 and the message is delivered for printing by the code shown in line 231. This delivery of the message to the user terminates the main routine. The remainder of the routines in the program listing describe functions that are used in the main routine and a function that is used to develop the dictionary list.

The function ed_g_org beginning on line 245 gets the original version of the string either from the local header table or from a file on the disk storage medium 106. This function modifies a character pointer, causing it to point to an original version of the message string. As used in line 189 of the main program it modifies the pointer which is stored in the variable of line 179. The external function set forth in line 250 picks up a message from the file on disk storage medium 106. If the variable ed_xnoold (tested in line 262) has a value of TRUE, there is no on-line documentation available and under these circumstances, the function edworg set forth in line 264 is called with the appropriate error number in order to obtain an error message from the local header table. If there is on-line documentation, that is, if ed_xnoold is false, the statements between lines 270 and 308 are executed. The statements on lines 272-275 set up the parameters for calling the error message library routine. This routine is called in lines 279-280, and the results are returned in parameters set forth in these lines. If the call is successful a string will be present in the "edoldb" buffer whose buffer storage space is reserved by the statement in line 253.

The function "edtr_def" in line 285 simply calls the translation definition routine to set up a term in the dictionary called "olderr" which is the return code number from the error message library. This term "olderr" is used to store the return code from the error message library. The definition of this term may be obtained using edtr_get and used to display a status message to the user. The statement in line 290 checks to determine if the call to the external storage medium was successful in returning an error message. If it was not successful, the statements of lines 293 and 295 are executed. The statement in line 293 calls the function "edworg" to obtain an error message from the local header table. The statement in line 295 sets "ed_xnoold" to a true value so that future attempts to obtain an error message will not waste time in going to the external storage medium.

If the call to the external storage medium is successful, the statement of lines 301 and 302 are executed causing an EOS to be placed at the end of the message and a character pointer to point to the message stored in the "edoldb" buffer.

The function "edworg" beginning on line 319 is the function used hereinafter to obtain an error message from the local header table. The statement in lines 327-329 simply compares the required error number to the error message numbers in the local header table to find the error number that is being called. This type of search permits the error message numbers to be out of sequence. The statement of line 331 simply sets the character pointer to the error message found in the local header table.

The function "edtr_def" beginning on line 343 is the routine which defines a translation for later use in the error message expansion. This function simply places definitions for terms in a dictionary table. The statements of lines 360-363 check to determine if there is a location for "oldname" already present in the dictionary list. The statement of line 365 copies the "oldname" or token word into the first word of the appropriate element in the dictionary table illustrated in FIG. 10. The statement of line 367 formats the arguments of the new definition according to the control parameters and places the results in the second word of the same element of the dictionary list illustrated in FIG. 10.

The function "edtr_get" beginning on line 382 is a routine that obtains a definition for a given token word. As indicated hereinabove, this token word is referred to as "oldname" and the function "edtr_get" simply looks up "oldname" and gives its corresponding new name from the dictionary list illustrated in FIG. 10. The for loop established in 391-394 causes the function to search until the "oldname" entry is found or until the search comes to the last entry. If "oldname" was actually found rather than reaching the end of the table or stopping after checking all possible matches, the statements of lines 396 and 397 causes the translation to be copied into the memory space labeled as "newname." If "oldname" was not found the statements of lines 399 and 400 causes "oldname" (i.e., the token word) to be followed by an equal sign and question mark (and placed in angle brackets) to indicate that there is no known translation for that token word.

The function "edtr_init" beginning on line 419 is an initialization function that is equivalent to step 201 in FIG. 2 and is called before the command in the main program which uses this invention is invoked. This function uses the function "edtr_def" to set up common translations for token words that are likely to be encountered in an error message. The function "edtr_init" is invoked before every command in the editor except the comment, null, and translate commands. The statement of line 426 causes the term "errcode" to be translated as "normal." The statement of line 428 causes "object" to be translated as "it." The statements of lines 430-445 causes the term "ftype" referring to the file type to be translated either as "relative," "indexed relative," "indexed sequential" or a default condition consisting of the word "unknown" followed by an equal sign and a numeric representation of the file type. The statements of lines 449 and 450 causes the term "filename" to have a definition of the file name presently being worked on by the editor. The term "cmdname" is usually caused to have a definition of the command name set up by individual command processing routines. During start up of the program, this term is defined as "unknown." The statements of lines 462-467 provide the definition for "recname," that is, for the record name.

Some of the definitions that are set up need only be defined when the main program, in this case the editor program, is initialized. These definitions are set forth in lines 474-506. They correspond to such things as the release number of the editor, the serial number of the editor, the version of the editor and profile of the editor user.

What has been described hereinabove is a specific embodiment that is implemented by using the C language. It should be apparent to those skilled in the art that other languages may be used equally as well in providing a program that will execute the steps of the present invention set forth in FIGS. 2 and 3-9 of the drawing.

APPENDIX

```
/*
        edmsg.c 1.41 of 1/6/82
*/
static char edmsg[ ] = "@(#)edmsg.c      1.41";

/*    #includes                  */
#include "edgenic.h"

#include <emext.h>
#endif

/*         #defines */ define PROMPT       ed_xmprompt
define MAX_MS_SZ 200
#define MAX_TN_SZ 80
#define MAX_TN_NUM 60
#define OLDN 0
#define NEWN 1

/**

NAME
    Editor Messages Handler
DESCRIPTION
    This file contains routines to obtain messages from the
    error message library, translate substitution strings,
    and define substitution strings. A structure containing
    default messages is also defined so that the on-line
    documentation routines may be bypassed, if desired.
SUPPLEMENTARY COMMENTS
    An undocumented option command, "/o old=off" may be
    used to bypass the on-line documentation library. An
    undocumented angle bracket command, "/<SUBNAME>=?",
    may be used to examine the translation of SUBNAME.
    Likewise, "/<SUBNAME>=NEWTRANS" may be used to
    set a new translation. Presently, translations are not recursive,
    so NEWTRANS is taken literally.

SEE ALSO
    emem.ext
**/

/* basic structure of the local message table */
```

APPENDIX-continued

```
structure msg_str{
    int msg_id;
    char *msg_string;
};

/* Table used if on-line doc is bypassed */ static struct msg_str edmsgtab[ ] = {

WED_000,
"Editor release <rel_num> version <sl_num> of <sccs_date>.",

WED_001,
"The '<cmdname>' command is not implemented.",

WED_002,
"Couldn't understand this '<cmdname>' command.",

WED_003,
"(<errcode>) Couldn't <cmdaname> <object>.",

WED_004,
"File \"<filename>\" is of type <ftype>.",

WED_005,
"The '<cmdname>' command is not allowed for this type of editing."

WED_006,
"The current record name is \"<recname>\".",

WED_007,
"(<errcode>) Unable to <cmdname> file \"<filename>\".",

WED_008,
"(<errcode>) Unable to <cmdname> record \"<recname>\" in
    file \"<filename>\".", WED_009,
"The <object> was too big. The maximum is <maximum>."

WED_010,
"Record keys only work with indexed files.",
WED_011,
"The editor <cmdname>s <numchars> character(s), using
    file \"<filename>\".",

WED_012,
"OK.",

WED_013,
"In file \"<profile>\" line <linenum>:",

WED_014,
"Unrecognizable command.",

WED_015,
"Check after the first line.",

WED_016,
"The '<cmdname>' command needs a key.",

WED_017,
"The record \"<recname>\" already exists.",

WED_018,
"Wasn't expecting <object>.",

WED_019,
"Record \"<recname>\" has no text.",

WED_020,
"Try \"<csig>chang <csig>to\".",

WED_021,
"<changenum> changes.",

WED_022,
"Keynames need a \"<csig>end\" at the end.",

WED_023,
"The character\"<illchar>\" is illegal in <object>s.",

WED_024,
"The record name(s) follow:",

WED_025,
"\"<recname>\"",

WED_026,
"Able to <cmdname> <numrecs> record(s).",

WED_027,
"No record is currently being edited.",

WED_028,
"File \"<filename>\" wasn't saved recently. Use <csig>q! to
    override.", WED_029,
"The <cmdname> command needs a filename.", WED_030,
"File \"<filename>\" already exists. Use <csig>s! to override.", WED_031,
"(<errcode>) Editing Interrupted", WED_032,
"Located <locnum>.", EOS, "Unknown message number <msgcode> for <cmdname>."};

/**
 * Structure used to hold name translation pairs.
 **/ static char ed_tr_names[ MAX_TN_NUM ][ 2 ][ MAX_TN_SZ ];

/**
 * Routine "edprwarn" prints the appropriate message
 * for a given warning code.
 **/ edprwarn( warn_num )    /*send out an appropriate warning message:*/
int warn_num;           /* the #define for the warning message */
{
    char buildtext[ MAX_MS_SZ ];  /* buffers the output */
    char oldname[ MAX_MS_SZ ];    /* name to be translated */
    char newname[ MAX_MS_SZ ];    /* a translation of oldname */
    char *original;               /* pointer to raw input string */
    int   btindex;                /* index to buildtext array */
    int   onindex;                /* index to old name array */
    int   nnindex;                /* index to new name */
    int   rc;

edtr_def("msgcode","%d",warn_num );/*define<msgcode> name*/
    ed_g_org( &original, warn_num );/* set original char ptr */ for( btindex = 0;
         *original != EOS && btindex < (MAX_MS_SZ - 1);
         original++ ){ if( *original == '<' ){ onindex = 0;
            original++;
            while( *original != '>' && *original != EOS &&
                onindex < ( MAX_TN_SZ - 1 ) ){ oldname[ onindex++ ] = *(original++);
            }
            oldname[ onindex++ ] = EOS;

edtr_get( oldname, newname, MAX_TN_SZ );

nnindex = 0;

while( nnindex < MAX_TN_SZ &&
                newnwme[ nnindex ] != EOS &&
                btindex < MAX_MS_SZ
            ){ buildtext[ btindex++ ] = newname[ nnindex++ ];
```

APPENDIX-continued

```
                }
            }
        else}
            buildtext[ btindex++ ] = *original;
            }
        }
    buildtext[ btindex++ ] = EOS;

rc = prmessage("%s%s\n", PROMPT, buildtext );

}
/**   Set a string pointer to an unsubstituted error message summary
      according to the on-line documentation package, if possible.
      Otherwise, use the local message table info.
**/
ed_g_org( char_pt_pt_, err_num )
char    **char_pt_pt;           /* address of the string pointer */
int     err_num;                /* the error code */
{
    extern    error_t    em_errmsg( );
    em_err_ret_t         re_results, re_input;
    em_buf_t  ebuf_struct;
    static    char       edoldb[ MAX_MS_SZ ];
    char                 *mnemonic;/* error mnemonic */
    int                  rc;

if( ed_xnoold == TRUE ){
        edworg( char_pt_pt, err_num );

} else { er_input.em_err_code = err_num;
        er_input.em_err_subs = "";
        ebuf_struct.em_bf_addr = edoldb;
        ebuf_struct.em_bf_max = MAX_MS_SZ;

rc = em_err_msg( &er_results, er_input, "",
                GEM_MESSAGE,      &ebuf_struct, GEM_NOHEADING, &mnemonic );

edtr_def( "olderr", "%d", er_results.em_err_code );
        if( er_results.em_err_code != SUCCESS &&
            er_results.em_err_code != WEM_UNSUBS ){ edworg( char_pt_pt, err_num );

ed_xnoold = TRUE;
        }
        else{
            edoldb[ ebuf_struct.em_bf_filled ] = EOS;
            *char_pt_pt = edoldb;
        }
    }
}

/**
    Set a string pointer to the right error message
    summary according to the internal editor message
    table, ignoring on-line documentation.
**/
edworg( char_pt_pt, err_num )
char    **char_pt_pt;           address of the string pointer */
int     err_num;                /* the error code */
{
    int i;

for( i = 0;
    edmsgtab[ i ].msg_id != err_num && edmsgtab[ i ].msg_id != 0;
    ++i );
    char_pt_pt = edmsgtab[ i ].msg_string;

}
**/
    Routine to define a translation for
    later use in error message expansion
**/
/*VARARGS2*/ edtr_def( oldstring, control, a1, a2, a3, a4, a5, a6, a7, a8 )
char  *oldstring;               /* before translation */
char  *control;                 /* printf pattern */
char  *a1;                      /* printf variable */
char  *a2;                      /* printf variable */
char  *a3;                      /* printf variable */
char  *a4;                      /* printf variable */
char  *a5;                      /* printf variable */
char  *a6;                      /* printf variable */
char  *a7;                      /* printf variable */
char  *a8;                      /* printf variable */
{
    int     i;

for( i = 0; i < MAX_TN_NUM &&
            strcmp( ed_tr_names[ i ][ OLDN ], oldstring ) != 0 &&
            strlen( ed_tr_names[ i ][ OLDN ] ) > 0;
            ++i );
    strncpy( ed_tr_names[ i ][ OLDN ], oldstring, MAX_TN_SZ );
    sprintf( ed_tr_names[ i ][ NEWN ], control, MAX_TN_SZ );

}

/*ARGSUSED*/

/**
    Routine to get a translation for a given string.
    If the translation is unknown the default translation
    of "<oldname=?>" is used.
**/
edtr_get( oldname, newname, max_sz )
char    *oldname;
char    *newname;
int     max_sz;
{
    int i;

for( i = 0; i < MAX_TN_NUM &&
            strcmp( ed_tr_names[ i ][ OLDN ], oldname ) != 0 &&
            strlen( ed_tr_names[ i ][ OLDN ] ) > 0;
            ++i );

if( strcmp( ed_tr_names[ i ][ OLDN ], oldname ) == 0 ){
        strncpy( newname, ed_tr_names[ i ][ NEWN ], max_sz );
    }
    else{
        sprintf( newname, "<%s = ?>", oldname );
    }

}

/**
    Routine to set up some common translations. It is
    invoked before every command except comment, null, and
    translate commands.

The first terms to be defined will be the fastest
    to retrieve or to redefine. That's why the terms
    that are only defined once appear last.
**/
edtr_init( )
{
    static doit = TRUE;
    extern char ed_stamp[ ];

edtr_def( "errcode", "normal" );

edtr_def( "object", "it" );

switch( ed_xftype ){
    case GED_REL_FILE:
        edtr_def( "ftype", "relative" );
        break;
    case GED_IREL_FILE:
        edtr_def( "ftype", "indexed relative" );
        break;
    case GED_ISEQ_FILE:
        edtr_def( "ftype", "indexed sequential" );
        break;

default:
```

APPENDIX-continued

```
        edtr_def( "ftype", ">Unknown = %d>", ed_xftype );
        break;
} if( strlen( ed_xfilename ) > 0 ){
        edtr_def( "filename", "%s", ed_xfilename );
}
else{
        edtr_def( "filename", "<Unknown>" );
}
if( ed_cmdnm = = (char *) 0 ){ ed_cmdcm = "unknown";
} edtr_def( "cmdname", "%s", ed_cmdnm );

if( strlen( ed_xkeynm ) > 0 ){
        edtr_def( "recname", "%s", ed_xkeynm );
}
else{
        edtr_def( "recname", ">Unidentified>" );
} edtr_def( "numchars", "0" );
edtr_def( "numrecs", "0" );
edtr_def( "csig", "%c", "ed_csig );
edtr_def( "maximum", "smaller" );

if(doit = = TRUE ){ /* only define these terms once */
        doit = FALSE;

/**
Manually change the release value to the generic number
**/
edtr_def( "rel_num", "1" );

edtr_def( "sl_num", "26" );

/**
Manually change the subrelease to the development subrelease
**/
edtr_def( "sub_rel", "D" );

edtr_def( "version", ed_stamp );

edtr_def( "sccs_date", "2/3/82" );

edtr_def( "prefix", "%s", ed_xprefix );

edtr_def( "auth", "0%o", ed_xauth );
edtr_def( "perm", "0%o", ed_xperm );
edtr_def( "textsz", "%d", ed_xtextsz );
edtr_def( "keysz", "%d", ed_xkeysz );

if( strlen( ed_xprofile ) > 0 ) {
        edtr_def( "profile", "%s", ed_xprofile );
}
else{
        edtr_def( "profile", "<Unknown>" );
}
    }
}
```

What is claimed is:

1. A method of operating a computer system so as to permit customized messages in response to a command that is invoked in an operating program, the messages being stored in an indexed file, at least some of the messages having token words that must be defined in order to provide a complete meaning to the message, said method comprising the steps of storing a dictionary set of definitions for token words, developing a condition to indicate that a particular message is required in response to the invocation of a command, retrieving a message from said indexed file in response to said condition, locating each token word that is present in the retrieved message, retrieving a definition from said dictionary set for said each token word that is present in the retrieved message, and replacing said each token word with its corresponding definition stored in said dictionary set.

2. A method as defined in claim 1 wherein the indexed file is stored in a first hardware location and the operating program includes an indexed table stored in a second hardware location and having messages stored therein, the step of retrieving a message from said indexed file includes the step of checking whether the indexed file is capable of being read, and the method further includes the step of retrieving a message from the indexed table in the event that the indexed file is incapable of being read.

3. A method of operating a computer system as defined in claim 2 wherein the step of retrieving a message from said indexed file further includes the steps of checking the indexed file for a message that corresponds to said condition, and retrieving a message from the indexed table in the event that no message corresponding to said condition is found in the indexed file.

4. A method of operating a computer system as defined in claim 1 wherein each token word in the indexed file is preceded by a distinctive character and the step of replacing said each token word with its corresponding definition includes the step of searching a retrieved message for said distinctive character.

5. A method of operating a computer system as defined in claim 1 wherein said step of storing a dictionary set of definitions for token words includes the steps of storing a first dictionary set of definitions for token words prior to the invocation of a command, and storing a second dictionary set of definitions for token words subsequent to the invocation of a command but prior to the step of retrieving a message from said indexed file.

6. A method of operating a computer system to generate messages in response to a predetermined condition that occurs in an operating program, the messages being stored in an indexed file, at least some of the messages having token words that must be defined in order to provide a message with a complete meaning, the operating program including a step of storing a dictionary set of definitions for token words, said method comprising the steps of retrieving a message from said indexed file in response to said condition, locating each token word that is present in the retrieved message, retrieving a definition from said dictionary set for said each token word that is present in the retrieved message, and replacing said each token word in the retrieved message with its corresponding definition from said dictionary set.

7. A method as defined in claim 6 wherein said indexed file is stored on a storage medium and the program includes a indexed table having messages with token words, said method further comprising the steps of determining whether said indexed file is capable of being read, and retrieving a message from said indexed table in the event that said indexed file is not able to be read.

8. A method as defined in claim 7 wherein the step of retrieving a message from said indexed file includes the steps of searching the indexed file for the message corresponding to said condition, and retrieving a message from said indexed table in the event that the message was not found in said indexed file.

9. A method as defined in claim 6 wherein each token word is preceded by a distinctive character and the step of replacing each token word includes the step of locating said distinctive character in a retrieved message.

* * * * *